United States Patent [19]

Kawasaki et al.

[11] Patent Number: 4,827,360

[45] Date of Patent: May 2, 1989

[54] ROTARY TRANSFORMER WITH WINDING TO CANCEL CROSSTALK

[75] Inventors: Satoshi Kawasaki; Mitsuhiro Arai; Yasuomi Namiki, all of Yokahoma, Japan

[73] Assignee: Victor Company of Japan, Ltd., Yokohama, Japan

[21] Appl. No.: 216,480

[22] Filed: Jul. 8, 1988

[30] Foreign Application Priority Data

Jul. 20, 1987 [JP] Japan ................. 62-180328

[51] Int. Cl.$^4$ ................. G11B 5/17; G11B 15/14
[52] U.S. Cl. ................. 360/64; 360/124; 360/66
[58] Field of Search .............. 360/64, 124, 66, 84, 360/108

[56] References Cited

U.S. PATENT DOCUMENTS

| | | | |
|---|---|---|---|
| 3,911,486 | 10/1975 | Hibbard | 360/64 |
| 4,369,476 | 1/1983 | Karsh | 360/124 |
| 4,639,805 | 1/1987 | Hirota et al. | 360/64 |

FOREIGN PATENT DOCUMENTS 0643646 6/1962 Canada.
0803624 10/1958 United Kingdom.

OTHER PUBLICATIONS

R. B. Hennis, "Cross Channel Coupling", IBM TDB, vol. 1, No. 5, Feb. 1959.
John D. Bick, "Crosstalk Cancellation in Multi-Channel Magnetic Recording System", RCA TN No. 398, Jun. 1960.

Primary Examiner—Alan Faber
Assistant Examiner—Surinder Sachar
Attorney, Agent, or Firm—Pollock, VandeSande & Priddy

[57] ABSTRACT

A magnetic recording/reproducing apparatus for magnetically recording and reproducing information on and from a magnetic tape. The apparatus includes a rotary drum adapted to be rotatable about its own axis and having at its circumferential portions a plurality of magnetic heads including at least first and second signal recording/reproducing magnetic heads and one signal erasing magnetic head. In order for coupling between the plurality of magnetic heads and a recording/reproducing circuit of this apparatus, further included is a rotary transformer which is provided between the rotary drum and a stationary portion of this apparatus and which includes first and second transformer coil assemblies coupled to the first and second magnetic heads, respectively, and one erasing coil assembly coupled to the erasing magnetic head. The erasing coil assembly is disposed between the first and second transformer coil assemblies to assume a magnetically neutral position with respect thereto. The recording/reproducing circuit is arranged so that the directions of recording currents through the first and second transformer coil assemblies are in reverse relation to each other, whereby induction currents due to magnetic fluxes produced by the recording currents therethrough are cancelled each other in the erasing coil assembly.

3 Claims, 2 Drawing Sheets

ROTARY TRANSFORMER WITH WINDING TO CANCEL CROSSTALK

BACKGROUND OF THE INVENTION

The present invention relates generally to helical-scanning multi-channel type magnetic recording/reproducing apparatus such as video tape recorder (VTR), and more particularly to improvement of a rotary transformer used in such a magnetic recording/reproducing apparatus.

A helical-scanning type magnetic recording/reproducing apparatus includes a rotational drum and a fixed drum which are arranged to be in coaxially opposed relation to each other and has a rotary transformer between the rotational drum and the fixed drum for performing coupling between magnetic heads and a recording/reproducing circuit. The rotary transformer has a plurality of transformer coil assemblies for recording and reproduction each comprising a rotary side coil provided on the rotational drum and a fixed side coil provided on the fixed drum and further has an erasing coil assembly coupled to an erasing magnetic head. Generally, in order to prevent the magnetic leakage caused by signal currents between the transformer coil assemblies or between the transformer coil assemblies (windings) and the erasing coil assembly, which induces undesirable currents in the other unintended heads, a plurality of short rings are equipped between the coil assemblies, and the short rings as many as possible to meet requirements improves the function of preventing the leakage. However, the provision of a large number of the short rings causes congestion on the provision of the transformer coil assemblies and the erasing coil assembly because of limitation to the dimension, thereby resulting in deterioration of the performance of the rotary transformer such as transfer characteristics and frequency characteristics and in its number of turns influencing the quality of the recording and reproduction.

SUMMARY OF THE INVENTION

It is therefore an object of the present invention to provide a magnetic recording/reproducing apparatus which is capable of preventing the deterioration of the quality of the recording and reproduction with an effective construction of the rotary transformer.

In accordance with the present invention, a magnetic recording/reproducing apparatus includes a rotary drum adapted to be rotatable about its own axis and having at its circumferential portions a plurality of magnetic heads including at least first and second signal recording/reproducing magnetic heads and one signal erasing magnetic head. In order for coupling between the plurality of magnetic heads and a recording/reproducing circuit of this apparatus, further included is a rotary transformer which is provided between the rotary drum and a stationary portion of the apparatus and which includes first and second transformer coil assemblies coupled to the first and second signal recording/reproducing magnetic heads, respectively, and one erasing coil assembly coupled to the signal erasing magnetic head, each of the first and second transformer coil assemblies and the erasing coil assembly respectively comprising a pair of a rotational coil and stationary coil disposed on the rotary drum and the stationary portion, respectively, so as to be in opposed relation to each other. The erasing coil assembly is disposed between the first and second transformer coil assemblies to assume a magnetically middle or neutral position with respect to the other two coil assemblies. The recording/reproducing circuit is coupled to the first and second transformer coil assemblies so that the directions of recording currents through the first and second transformer coil assemblies are in reverse relation to each other, whereby induction currents due to magnetic fluxes produced by the recording currents therethrough are cancelled each other with respect to the erasing coil assembly.

Preferably, the rotational coil of the first transformer coil assembly is coupled to a head coil of the first signal recording/reproducing magnetic head such that a first terminal of the rotational coil thereof is connected to a second terminal of the head coil thereof and a second terminal of the rotational coil thereof is connected to a first terminal of the head coil thereof. On the other hand, the rotational coil of the second transformer coil assembly is coupled to a head coil of the second signal recording/reproducing magnetic head such that a first terminal of the rotational coil thereof is connected to a first terminal of the head coil thereof and a second terminal of the rotational coil thereof is connected to a second terminal of the head coil thereof, whereby the recording currents to the first and second signal recording/reproducing magnetic heads are coincident in phase with each other.

BRIEF DESCRIPTION OF THE DRAWINGS

The present invention will be described in further detail with reference to the accompanying drawings, in which.

DETAILED DESCRIPTION OF THE INVENTION

Figure 1:
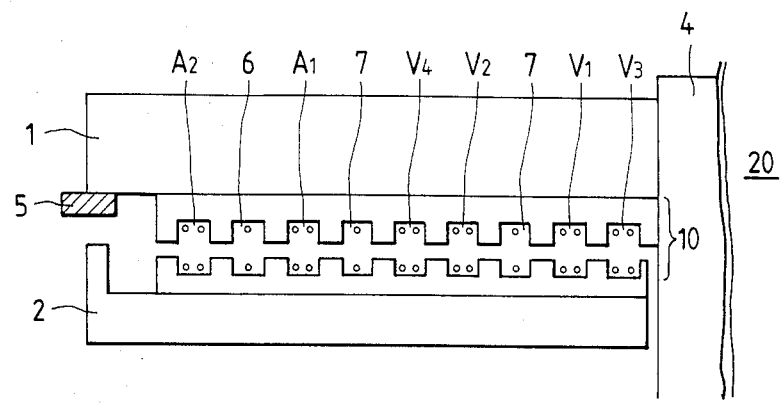
FIG. 1 is a cross-sectional view principally showing a rotary transformer of a helical-scan multi-channel type magnetic recording/reproducing apparatus according to the present invention.
Figure 2:
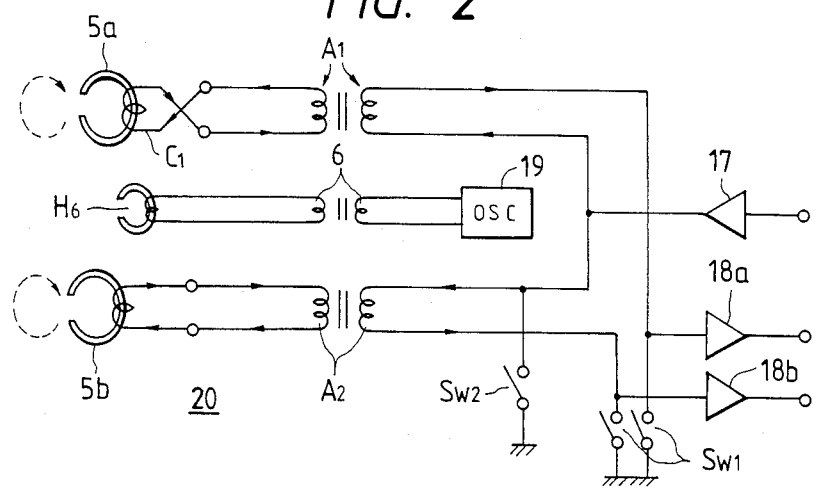
FIG. 2 is an illustration of a circuit arrangement of a rotary transformer for coupling between rotary magnetic heads and a recording/reproducing circuit.
Figure 3:
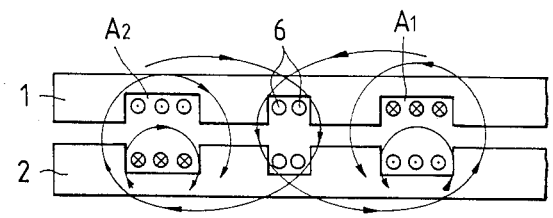
FIG. 3 is an illustration for describing magnetic fields produced in the rotary transformer.

An embodiment of the present invention will be described hereinbelow with reference to FIGS. 1 to 3, FIG. 1 being a cross-sectional view principally showing a rotary transformer of a helical-scanning multi-channel type magnetic recording/reproducing apparatus of this embodiment, FIG. 2 showing a circuit arrangement between magnetic heads and a recording/reproduction circuit of the magnetic recording/reproducing apparatus, and FIG. 3 being an illustration for describing magnetic fields produced in the rotary transformer of the FIG. 1 apparatus. In FIG. 1, the magnetic recording illustrated by reference numeral 20 includes a rotational drum 1 and a fixed, or stationary, drum 2 which are arranged up and down so as to be in coaxially opposed and spaced relation to each other. The rotational drum 1 has a plurality of magnetic heads 5 at its circumferential portions and being adapted to be rotatable about a shaft 4 by means of a driving device such as motor, not shown. Between the rotational drum 1 and the fixed drum 2 is formed a rotary transformer 10 having a plurality of transformer coil assemblies A1, A2 (for Hi-Fi audio signals) and V1 to V4 (for video signals) each comprising a rotary-side coil fitted in a groove defined in a ferrite core which constitutes the lower portion of the rotational drum 1 and a fixed-side coil fitted in a groove defined in a ferrite core which constitutes the upper portion of the fixed drum 2 which are in opposed relation to each other. Thereby, as shown in FIG. 2, the plurality of magnetic heads 5 (here, 5a and 5b) are coupled to amplifiers 17, 18a and 18b of a recording/reproducing processing circuit, not shown, of this apparatus, the amplifier 17 being for recording and the amplifiers 18a and 18b being for left and right audio channel reproduction. Also included in the rotary transformer 10 are pairs of short rings 7 for prevention of the leakage of signal currents between the transformer coil assemblies, the short rings 7 being fitted in grooves defined in the lower portion of the rotational drum 1 and the upper portion of the fixed drum 2 making up opposing pairs therebetween. In FIG. 2, the amplifiers 17, 18a and 18b are coupled to switches Sw2 and Sw1 which are operated according to the recording and reproduction modes of the apparatus. The apparatus 20 further includes an erasing head H6 which may be provided on the rotational drum 1 and which is coupled through an erasing coil assembly 6 to an oscillator (OSC) 19 which is operated on the recording to supply an erase current through the erasing coil assembly 6 to the erasing head H6. The erasing coil assembly 6, as shown in FIG. 1, comprises a pair of erasing coils similarly fitted in grooves defined in the ferrite cores of the lower portion of the rotational drum and the upper portion of the fixed drum so as to be in opposed relation to each other and is disposed between the transformer coil assemblies A1 and A2 so as to assume a magnetically neutral position with respect to the coil assemblies A1 and A2. Here, the corresponding coils (rotary side coils or fixed side coils) of the transformer coil assemblies A1 and A2 are arranged to have same winding with respect to starts and finishes of the windings. The recording/reproducing circuit is coupled to the transformer coil assemblies A1 and A2 so that the directions of recording currents to the transformer coil assemblies A1 and A2 are made in reverse relation to each other as indicated by arrows in FIG. 2. That is, with respect to the transformer coil assembly A1, the recording current is supplied from the finish of the winding to the start of the winding of each coil and, with respect to the transformer coil assembly A2, the recording current is supplied from the start of the winding to the finish of the winding of each coil. With this current-direction arrangement, as understood in FIG. 3, induction currents due to leakage of magnetic fluxes produced in response to the flows of the recording currents thereinto are cancelled each other in the erasing coil assembly 6 as the erasing coil assembly 6 is substantially spaced equally from the both transformer coil assemblies A1 and A2. On the other hand, although an erasing current is supplied from the oscillator, 19 through the erasing coil assembly 6 to the erasing head H6 on recording, at this time, the magnetic field due to the supply of the erasing current thereto is leaked to the transformer coil assemblies A1 and A2. However, the oscillation frequency of the oscillator 19 is higher by several times as compared with the frequency range for the recording of the audio signal, and therefore an adverse effect thereby does not occurs to the transformer coils A1 and A2. For example, in this embodiment, the frequency band of the recording signal supplied to the transformer coils A1 and A2 may be set to be 1.95 MHz at maximum (for example, 1.15 to 1.85 MHz for NTSC system and 1.25 to 1.95 for PAL/SECAM system, current value: about 35 mA$_{p-p}$) and the frequency of the erasing signal supplied to the erasing coil assembly 6 may be set to be about 14 MHz (for example, over 10 MHz in the case of an extended frequency range home video system and over 7 MHz in the case of a regular video system, current value: 150 mA$_{p-p}$). Here, it is known that, when the phases of the recording signals to the transformer coil assemblies A1 and A2 are in opposite relation to each other, the recording on a magnetic tape is effected by antiphase magnetization, particularly, during the overlapping period in which both the magnetic heads 5a and 5b are brought into contact with the magnetic tape in the two-head system. This is undesirable in view of the recording tape to apparatus compatibility. For this reason, in this embodiment, the connection between the rotary side coil of the transformer coil assembly A1 and a head coil C1 of the magnetic head 5a, as shown in FIG. 2, is purposely reversed with respect to the other head 5b and rotary side coil of A2 such that the winding-start terminal of the rotary side coil thereof is connected to the winding-end terminal of the head coil C1 and the winding-finish terminal thereof is connected to the winding-start terminal of the head coil C1, thus the connecting lines therebetween being partially arranged to insulatively cross each other so as to form a x-configuration. This allows the directions of the magnetic fields developed by both the heads 5a and 5b are in phase with each other, whereby the recording signals as well as the reproduced signals at the heads become in phase with each other.

Figure 4:
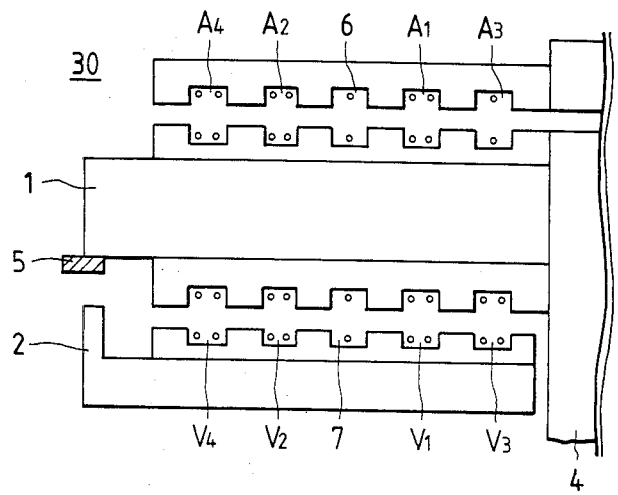
FIG. 4 is a cross-sectional view showing a further arrangement of the rotary transformer of the magnetic recording/reproducing apparatus according to this invention.

FIG. 4 is an illustration of a further embodiment of the present invention in which parts corresponding to those in FIG. 1 are marked with the same numerals and characters and the detailed description will be omitted for brevity. In FIG. 4, the apparatus illustrated by numeral 30 has four magnetic heads 5 for audio signals which are in turn coupled to four transformer coil assemblies A1, A2 (for standard mode), A3, A4 (for extended-time mode, i.e., three times standard playing time for the same length of tape). As well as in the above-mentioned first embodiment, the transformer coil assemblies A1 and A2 are arranged so as to be coincident in winding start point and in winding direction with each other and further the transformer coil assemblies A3 and A4 are arranged so as to be coincident in winding start point and in winding direction with each other. Here, one important feature of this embodiment is that the transformer coil assemblies A1, A3 and A2, A4 are symmetrically positioned with respect to an erasing coil assembly 6 whereby the magnetic fields due to the transformer coil assemblies A3 and A4 as well as A1 and A2 are cancelled each other in the erasing coil assembly 6 as described above with reference to FIG. 3, thereby preventing the occurrence of induction currents.

Figure 5:
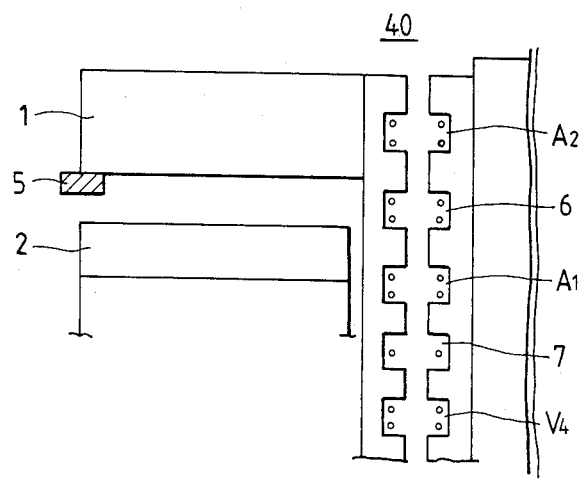
FIG. 5 is a cross-sectional view showing a still further arrangement of the rotary transformer of the magnetic recording/reproducing apparatus according to this invention.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above description the rotary transformer is positioned between the rotary drum and the fixed drum, it is also appropriate that, as shown in FIG. 5, the rotary transfomer is so constructed along and around the rotary shaft of the apparatus illustrated by numeral 40.

What is claimed is:

1. A magnetic recording/reproducing apparatus for recording and reproducing information on and from a magnetic tape, comprising:
    a rotary drum adapted to be rotatable about its own axis and having at its circumferential portions a plurality of magnetic heads including at least first and second signal recording/reproducing magnetic heads and one signal erasing magnetic head; and
    a rotary transformer provided between said rotary drum and a stationary portion of said apparatus to couple said plurality magnetic heads to recording-/reproducing circuit means of said apparatus, said rotary transformer including first and second transformer coil assemblies coupled to said first and second signal recording/reproducing magnetic heads, respectively, and one erasing coil assembly coupled to said signal erasing magnetic head, each of said first and second transformer coil assemblies and said erasing coil assembly respectively comprising a pair of a rotational coil and stationary coil disposed on said rotary drum and said stationary portion, respectively, so as to be in opposed relation to each other, said erasing coil assembly being disposed between said first and second transformer coil assemblies to assume a magnetically neutral position with respect to leakage fluxes from said first and second transformer coil assemblies;
    wherein said recording/reproducing circuit means is coupled to said first and second transformer coil assemblies so that the directions of recording currents through said first and second transformer coil assemblies are in reverse relation to each other, whereby induction currents due to magnetic fluxes produced by said recording currents therethrough are cancelled each other in said erasing coil assembly.

2. A magnetic recording/reproducing apparatus as claimed in claim 1, wherein said rotational coil of said first transformer coil assembly is coupled to a head coil of said first signal recording/reproducing magnetic head such that a first terminal of said rotational coil thereof is connected to a second terminal of said head coil thereof and a second terminal of said rotational coil thereof is connected to a first terminal of said head coil thereof and, whereas, said rotational coil of said second transformer coil assembly is coupled to a head coil of said second signal recording/reproducing magnetic head such that a first terminal of said rotational coil thereof is connected to a first terminal of said head coil thereof and a second terminal of said rotational coil thereof is connected to a second terminal of said head coil thereof, whereby said recording currents to said first and second signal recording/reproducing magnetic heads are fed to be coincident in phase with each other.

3. A magnetic recording//reproducing apparatus as claimed in claim 1, further comprising a fixed drum which is disposed to be in coaxially opposed relation to said rotary drum, said rotary transformer being provided between said rotary drum and said fixed drum.

* * * * *